Figures 1, 2:
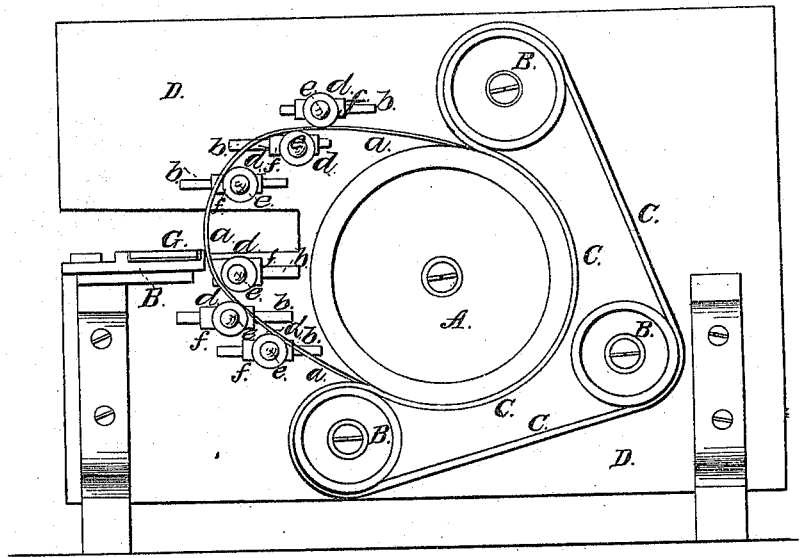

G. Thompson,
Band Saw Mill,
N° 81,434. Patented Aug. 25, 1868.

Witnesses:
Wm A. Morgan.
A. C. Cotton

Inventor:
Geo. Thompson,
per Munn & Co
Attorneys.

United States Patent Office.

GEORGE THOMPSON, OF NASHUA, NEW HAMPSHIRE.

Letters Patent No. 81,434, dated August 25, 1868.

IMPROVEMENT IN BELT-SAWS.

The Schedule referred to in these Letters Patent and making part of the same.

TO ALL WHOM IT MAY CONCERN:

Be it known that I, GEORGE THOMPSON, of Nashua, in the county of Hillsboro, and State of New Hampshire, have invented a new and useful Improvement in Operating Belt-Saws; and I do hereby declare that the following is a full, clear, and exact description thereof, which will enable others skilled in the art to make and use the same, reference being had to the accompanying drawings, forming part of this specification, in which—

Figure 1 is a side view of my invention.
Figure 2 is a detail top view of the table.
Similar letters of reference indicate like parts.

The object of this invention is to provide a means of operating belt-saws, whereby the curve of the saw, a the point of its operation on the wood, may be varied to cut staves, lagging, (so called,) and other work of curved character, for which it may be applicable.

It consists of a belt-saw steadied by a number of adjustable small pulleys, and running on a main pulley which is driven by a driving-belt which is so arranged upon several other pulleys as to hug the main driving pulley for half of its circumference, and by its friction against the same transmit motion to it.

In the accompanying drawings the main driving-pulley is shown at A. The saw $a$ is an ordinary belt-saw of flexible quality running on the pulley A, as shown, and held in a suitable curve by the rollers or small pulleys $d\ d\ d$, &c., of any suitable number, some of the said small pulleys being within and some without the saw as shown, for the purpose of holding the part of the saw which is not in contact with the pulley A in the desired curve, suitable for sawing timber with the desired curve.

The small pulleys are adjustable to and fro by means of the blocks $f$, which bear the bosses or studs $e$, on which the said pulleys revolve, the studs $e$ being provided with set-nuts, which, when screwed up, impinge against the back of the plate D, in which the slots are made, thus holding the small pulleys firmly fixed in the desired position for maintaining the cutting part of the saw in requisite curve.

The driving-belt C is made to hug the pulley A by the three pulleys B B B, arranged in such correlation to the pulley A, as to cause the belt to lie or hug against the said pulley, and thus drive it and the saw. The belt also embraces the saw upon the pulley A, and holds it firmly to the same, as shown.

The saw-table H is provided with a curved carriage, G, which slides in a correspondingly-curved groove the table, thus serving as a feed-board to guide the wood being sawed in the proper curved direction as it is fed up to the saw, thus enabling staves or other curved forms to be sawed with regularity.

The bosses or studs of the pulleys A B B B may be affixed to the plate D, or in any other suitable arrangement or frame.

The feed-table may be variously modified, nothing being claimed in the particular construction shown.

The actuating-powers may be transmitted to the pulley A, or to that of any one of the pulleys B B.

Having thus described my invention, I claim as new, and desire to secure by Letters Patent—

The arrangement, substantially as herein shown and described, of the pulleys $d$, each adjustable independently of the others, with relation to the pulley A and saw $a$, as set forth.

GEORGE THOMPSON.

Witnesses:
HENRY A. SPOFFORD,
SMITH G. MOONEY.